United States Patent [19]

Blanton, Jr. et al.

[11] Patent Number: 4,521,389

[45] Date of Patent: * Jun. 4, 1985

[54] PROCESS OF CONTROLLING NO$_x$ IN FCC FLUE GAS IN WHICH AN SO$_2$ OXIDATION PROMOTOR IS USED

[75] Inventors: William A. Blanton, Jr., Woodacre; William L. Dimpel, Oakland, both of Calif.

[73] Assignee: Chevron Research Company, San Francisco, Calif.

[*] Notice: The portion of the term of this patent subsequent to Feb. 28, 2001 has been disclaimed.

[21] Appl. No.: 462,171

[22] Filed: Jan. 31, 1983

Related U.S. Application Data

[63] Continuation-in-part of Ser. No. 308,689, Oct. 10, 1981, abandoned.

[51] Int. Cl.$^3$ ............................................. C01B 21/00
[52] U.S. Cl. ................................... 423/235; 208/113; 208/120; 502/42
[58] Field of Search .................. 423/235, 239, 239 A, 423/235 D, 244 A, 244 R; 208/113, 120; 502/42

[56] References Cited

U.S. PATENT DOCUMENTS

| 2,673,141 | 3/1954 | Barman | 423/235 |
| 3,873,671 | 3/1971 | Reed et al. | 423/235 D |
| 3,900,554 | 8/1975 | Lyon | 423/235 |
| 4,033,726 | 7/1977 | Reed et al. | 423/210 |
| 4,071,436 | 1/1978 | Blanton et al. | 208/120 |
| 4,113,838 | 9/1978 | Koike et al. | 423/235 |
| 4,115,515 | 9/1978 | Tenner et al. | 423/235 |
| 4,117,075 | 9/1978 | Sano | 423/235 |
| 4,129,651 | 12/1978 | Koike et al. | 423/235 |
| 4,181,705 | 11/1980 | Gummerman | 423/235 |
| 4,199,435 | 4/1980 | Chessmore et al. | 208/120 |
| 4,216,060 | 8/1980 | Murata et al. | 423/239 |
| 4,235,704 | 11/1980 | Luckenbach | 423/235 |
| 4,235,851 | 11/1980 | Flockenhaus | 423/235 |
| 4,309,309 | 1/1982 | Blanton | 208/113 |
| 4,434,147 | 2/1984 | Dimpfl et al. | 423/239 |

FOREIGN PATENT DOCUMENTS

| 52-8975 | 1/1975 | Japan | 423/235 |
| 1388669 | 3/1975 | United Kingdom | 423/235 |

Primary Examiner—Gregory A. Heller
Attorney, Agent, or Firm—S. R. La Paglia; J. W. Ambrosius; Q. T. Dickinson

[57] ABSTRACT

NO$_x$ in flue gas from a regenerator in which an SO$_2$ oxidation promoter is present is controlled by mixing ammonia with flue gas and passing the mixture through a combustion zone.

8 Claims, 1 Drawing Figure

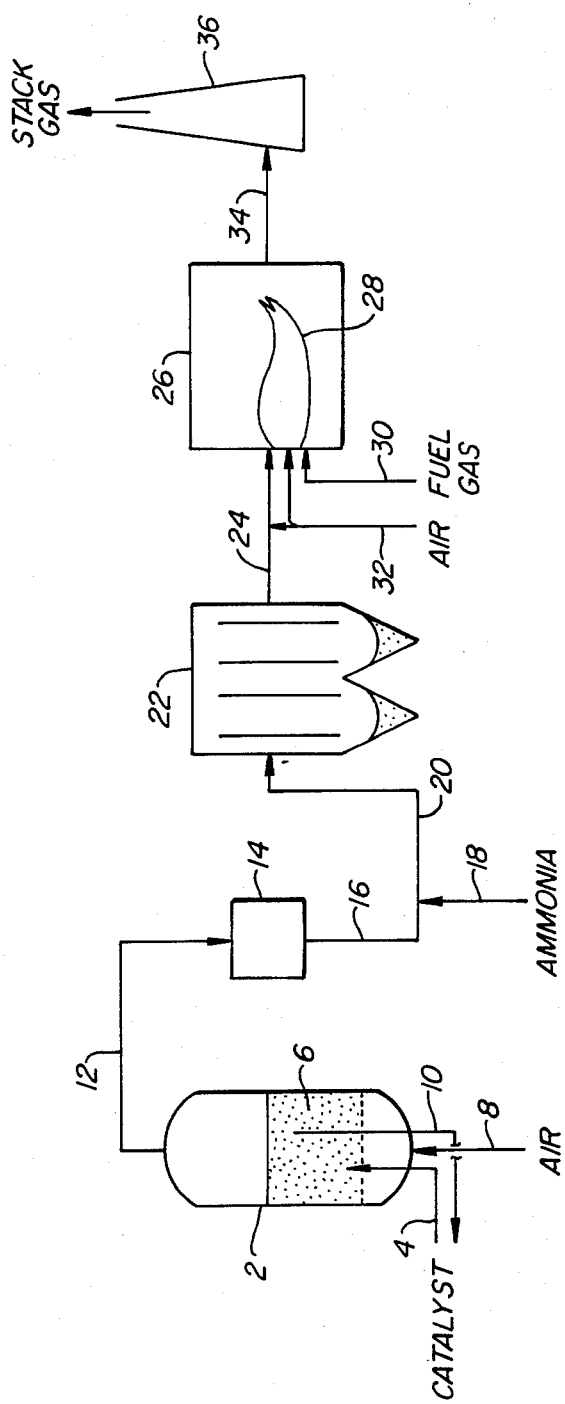

PROCESS OF CONTROLLING NO$_x$ IN FCC FLUE GAS IN WHICH AN SO$_2$ OXIDATION PROMOTOR IS USED

CROSS-REFERENCE TO RELATED APPLICATION

This application is a continuation-in-part of U.S. patent application Ser. No. 308,689, filed Oct. 10, 1981 now abandoned.

FIELD OF THE INVENTION

This invention is concerned with the control of nitrogen oxides, especially nitric oxide, in the flue gas leaving the regenerator of an FCC unit.

BACKGROUND OF THE INVENTION

Sulfur oxides formed in the regenerator of a fluidized catalytic cracking unit during the combustion of the coke deposited on the catalyst particles may be controlled by including in the circulating inventory of the unit a sulfur oxide sorbent, such as reactive alumina, capable of sorbing the sulfur oxides in the regenerator and releasing them as hydrogen sulfide in the presence of hydrocarbons in the cracking vessel. See U.S. Pat. No. 4,071,436. The efficiency of such a sulfur oxides control system is enhanced by the presence of a sulfur dioxide oxidation promoter, such as platinum. These sulfur dioxide oxidation promoters aid the formation of sulfur trioxide in the regenerator which is more readily sorbed by the sulfur oxide sorbent than sulfur dioxide. However, a disadvantage of this method of controlling sulfur oxides is that the promoter has been observed to increase the amount of nitrogen oxides present in the regenerator flue gas. Since the oxides of nitrogen are themselves noxious gases, it is desirable to control the amount of nitrogen oxides, especially nitric oxide (NO), in the flue gas. The disclosure of U.S. Pat. No. 4,071,436 is herewith incorporated by reference into this specification.

U.S. Pat. No. 3,900,554 teaches a method for selectively reducing nitric oxide by mixing an effluent stream containing nitric oxide with ammonia and oxygen. The resulting mixture is subjected to a high temperature, preferably in the presence of a reducing material such as hydrogen. Various other processes have been described for reducing nitrogen oxides using ammonia, but most of these methods utilize a catalyst.

SUMMARY OF THE INVENTION

The present invention is directed to a process for controlling the oxides of nitrogen, especially nitric oxide, in a flue gas containing said oxides from the regenerator of a fluid catalytic cracking unit in which the sulfur oxides formed in the regenerator are controlled by means of a circulating sulfur oxide sorbent used in combination with a sulfur dioxide oxidation promoter, said process comprising:

(a) mixing the flue gas at a temperature between about 500° F. and about 1600° F. with a sufficient amount of ammonia or an ammonia generating compound to provide at least a stoichiometric amount of ammonia relative to the degree of nitrogen oxide control desired; and (b) passing the mixture of flue gas and ammonia through a combustion zone having a temperature in the range of from about 1200° F. for a time sufficient to significantly lower the amount of nitrogen oxides present in the effluent from the combustion zone relative to that present in the flue gas.

As used herein, the term "nitrogen oxide" or "nitrogen oxides" refers to the various oxides of nitrogen which may be present in the flue gas leaving the regenerator. Thus, the term refers to nitric oxide (NO), nitrogen dioxide (NO$_2$), nitrogen peroxide (N$_2$O$_4$), nitrogen pentoxide (N$_2$O$_5$), and mixtures thereof. The process herein described is especially concerned with the reduction and control of nitric oxide, since nitric oxide typically comprises greater than 90% of the nitrogen oxides in regenerator flue gas. Since the other oxides of nitrogen mentioned above interconvert rapidly at the temperature of the process, reduction of the other oxides will also take place.

In addition, as used herein, the term "flue gas" will refer to the gases leaving the regenerator of the fluid catalytic cracking unit. This is to distinguish the flue gases containing the nitrogen oxides formed in the regenerator from the combustion gases leaving the combustion zone where the nitrogen oxide control is effected. These latter combustion gases will be referred to as "combustion effluent" or "effluent from the combustion zone" to avoid confusion.

BRIEF DESCRIPTION OF THE DRAWING

The FIGURE is a flow diagram which illustrates one method for carrying out the present invention.

DETAILED DESCRIPTION OF THE INVENTION

In the typical fluid catalytic cracking unit (FCC unit), a particulate catalyst is cycled between a cracking zone in which the hydrocarbon feedstream is cracked and a regeneration zone in which the coke deposited on the catalyst is burned off in the presence of oxygen. Since the coke generally contains some sulfur compounds (the amount usually depends on the sulfur content of the hydrocarbon feed), during regeneration significant amounts of sulfur dioxide and sulfur trioxide are formed. As already noted, these oxides of sulfur may be controlled by including in the circulating inventory of the FCC unit, i.e., the inventory of particles cycled between the cracking zone and the regeneration zone, a sulfur oxide sorbent such as reactive alumina. The sulfur oxide sorbent may be incorporated into the cracking catalyst particles as a separate phase, but most preferably is included as particles separate from the particulate cracking catalyst. Since sulfur trioxide is more readily sorbed by the sulfur sorbent than sulfur dioxide, a sulfur dioxide oxidation promoter, usually a noble metal such as platinum, is present in the regenerator. The oxidation promoter is preferably part of the circulating inventory of the FCC unit. Usually, the promoter is present on a particulate support separate from the catalyst particles and the sulfur sorbent.

Although relatively free of sulfur compounds, the flue gases leaving the regenerator will usually contain significant amounts of nitrogen oxides chiefly in the form of nitric oxide. According to the present invention, the flue gas is mixed with ammonia or a compound which will yield ammonia under the conditions of operation. The temperature of the flue gas/ammonia mixture usually will not exceed about 1600° F. and is generally considerably cooler, i.e., less than 1000° F. In the absence of a reducing material such as hydrogen or a catalyst, very little of the nitrogen oxides will be reduced at these temperatures.

The flue gas/ammonia mixture is passed through a zone of active combustion having a temperature falling within the range of from about 1200° F. to about 2000° F. The residence time of the flue gas/ammonia mixture in the flame should be of sufficient duration to allow for the reduction of the nitrogen oxide to nitrogen. Generally, the reduction will be completed in a second or two, depending on the temperature of the flame and the manner of passing the mixture through the flame.

The amount of ammonia present in the mixture is not critical so long as at least a stoichiometric amount is present relative to the amount of nitrogen oxide to be controlled. However, the efficiency of the process is improved by increasing the amount of ammonia above this minimum level. Therefore, the process may be operated with the ammonia at several times the stoichiometric amount. In the case of nitric oxide, a stoichiometric amount is one mole of ammonia to one mole of nitric oxide.

Free oxygen is believed to be required for the reduction to take place. However, since oxygen is necessary for the combustion as well, it is not necessary to add the oxygen separately to the ammonia/flue gas mixture. However, to insure that sufficient oxygen is present, the combustion should be carried out in a oxygen-rich mode rather than in an oxygen-lean mode.

The selection of fuels for the combustion zone is not critical. Generally, refinery fuel gas is readily available at the site at which FCC units are located and provides a convenient fuel. Such fuel gases are usually composed of principally methane and hydrogen with lesser amounts (generally about 10% or less) of other lower hydrocarbons.

The exact reaction which occurs in the combustion zone is not well understood, but it is believed the reduction that take place yields nitrogen and water as products. Such reductions of nitrogen oxides have been known to occur in the presence of catalysts and under other conditions. Although it is assumed the same basic reactions are occurring, the present invention is not limited by any particular chemical reaction or mechanism.

In order to further clarify the invention, one preferred way of carrying out the process is illustrated in the FIGURE. Coked catalyst is carried from the cracking vessel (not shown) of the FCC unit to the catalyst regenerator 2 via transfer conduit 4. The spent catalyst is regenerated in a fluidized bed 6 by burning the coke off the catalyst in the presence of air introduced at the bottom of the regenerator 2 by means of air conduit 8. In addition to the particles of cracking catalyst, a separate particulate sulfur sorbent and separate particles of a supported sulfur dioxide oxidation promoter are present in the circulating inventory of the FCC unit. Therefore, sulfur dioxide formed in the regenerator is oxidized to sulfur trioxide and sorbed by the sulfur sorbent before leaving the fluidized bed 6. The regenerated catalyst, sulfur sorbent plus sorbed sulfur trioxide, and sulfur dioxide oxidation promoter are returned to the cracking vessel via transfer conduit 10. In the presence of hydrocarbons in the cracking vessel, the sorbed sulfur compounds are released as hydrogen sulfide.

Referring back to the regenerator 2, nitrogen oxides, especially nitric oxide, formed in the oxidizing environment of the regenerator pass out of the fluidized bed 6 and leave the regenerator with the flue gas via conduit 12. In FCC units as described herein, nitrogen oxides are generally present in the flue gas in amounts of about 400 to 1300 ppm. From the regenerator, the flue gas is carried via conduit 12 to a flue gas cooler 14 where heat from the hot flue gas is recovered. The temperature of the flue gs leaving the flue gas cooler via conduit 16 is typically between about 500° F. and 700° F. Ammonia is injected into the cooled flue gas by means of conduit 18, and the resulting ammonia/flue gas mixture is carried by conduit 20 to an electrostatic precipitator 22. In the electrostatic precipitator, particulate materials are removed from the ammonia/flue gas mixture and collected at the bottom of the precipitator. This arrangement is particularly advantageous since the presence of the ammonia in the flue gas is known to enhance the removal of particulates by the electrostatic precipitator. A further advantage of carrying out the process in this manner is that it has been found that the silica-alumina catalyst fines trapped by the precipitator may serve as a catalyst for the reduction of nitrogen oxides in the presence of ammonia. Thus, some control (about 5% to 15%) has been observed to take place in the precipitator itself before the mixture of ammonia and flue gas passes to the combustion zone. In carrying out this phase of the process at least a stoichiometric amount of ammonia is mixed with the flue gas, i.e., sufficient ammonia to reduce all of the nitrogen oxides present. Preferably, excess ammonia is used often at two or three times the stoichiometric amounts.

The ammonia/flue gas mixture is carried via conduit 24 to a boiler 26 where the mixture is passed through a flame 28. The flame is fueled by refinery fuel gas entering the boiler by means of conduit 30. Air for combustion is supplied by conduit 32. A portion of this air may be pre-mixed with the ammonia/flue gas mixture. The nitrogen oxides are reduced to nitrogen gas during the passage of the flue gas/ammonia mixture through boiler flame 28. In the combustion effluent leaving the boiler 26 via conduit 34, reductions in the amount of nitrogen oxides have been observed in the order of about 75% using a stoichiometric amount of ammonia. The combustion effluent is sent to a stack 36 where it is released to the atmosphere. Despite the excess ammonia present in the flue gas/ammonia mixture, very little ammonia, i.e., less than 10 ppm, has been observed leaving the stack with the combustion effluent. Therefore, the use of the excess ammonia does not result in a serious emission problem when the combustion effluent leaves the stack.

The above description is directed to one preferred means for carrying out the present invention. Those skilled in the art will recognize that other means which are equally effective could be devised for carrying out the spirit of this invention.

It is also possible to carry out this process as a two-step or multi-step combustion process in which additional ammonia is mixed with the partially cooled combustion effluent from the combustion zone. This effluent/ammonia mixture may be passed to a second combustion zone where the ammonia reacts to reduce any remaining nitrogen oxides. This may be advantageous where the first combustion zone is fueled by a high nitrogen fuel (some fuel oils and fuel gases contain substantial amounts of nitrogen). In this embodiment, ammonia is mixed with the combustion effluent from one or more combustion zones fired with a high nitrogen fuel oil. The combustion effluent from these primary combustion zones may contain significant amounts of nitrogen oxide. The effluent/ammonia mixture from each of the primary combustion zones would be sent to a secondary combustion zone fueled by a low nitrogen fuel. The final stack gas vented to the atmosphere after secondary treatment would contain significantly less nitrogen oxide.

In another embodiment of the invention, the combustion effluent is mixed with additional ammonia and recycled to the combustion zone.

What is claimed is:

1. A process for controlling the oxides of nitrogen in a flue gas, containing said oxides, from the regenerator of a fluid catalytic cracking unit in which the sulfur oxides formed in the regenerator are controlled by means of a circulating sulfur oxide sorbent used in combination with a sulfur dioxide oxidation promoter, said process comprising:
   (a) mixing the flue gas at a temperature between about 500° F. and about 1600° F. with a sufficient amount of ammonia or an ammonia-generating compound to provide at least a stoichiometric amount of ammonia relative to the degree of nitrogen oxide control desired; and
   (b) passing the mixture of flue gas and ammonia through an oxygen-rich combustion zone having a temperature in the range of from about 1200° F. to about 2000° F. for a time sufficient to significantly lower the amount of nitrogen oxides present in the effluent from the combustion zone relative to that present in the flue gas.

2. The process of claim 1 wherein the flue gas and ammonia are mixed at a temperature not exceeding 1000° F.

3. The process of claim 1 wherein ammonia in excess of the stoichiometric amount is mixed with the flue gas.

4. The process of claim 1 wherein the flue gas and ammonia mixture is passed through an electrostatic precipitator.

5. The process of claim 1 including the additional steps of:
   (c) mixing the combustion effluent from step (b) with additional ammonia; and
   (d) passing the resulting mixture through a second combustion zone under conditions similar to those of step (b) to further reduce any remaining nitrogen oxides present in the gases.

6. The process of claim 5 wherein the first combustion zone of step (b) is fired by a high nitrogen fuel and the second combustion zone of step (d) is fired by a low nitrogen fuel.

7. The process of claim 1 including the additional step of mixing ammonia with the combustion effluent of step (b) and recycling the resulting mixture through the combustion zone to further reduce any remaining oxides present in the gases.

8. The process of claim 1, 2, 3, 4, 5, 6, or 7 wherein the oxides of nitrogen present in the flue gas are nitric oxide, nitrogen dioxide, or a mixture thereof.

* * * * *